US011803303B1

(12) United States Patent
Huo et al.

(10) Patent No.: US 11,803,303 B1
(45) Date of Patent: Oct. 31, 2023

(54) INTELLIGENT LAYER CONTROL OF REDUNDANT CONTENT IN CONTAINER IMAGES

(71) Applicant: INTERNATIONAL BUSINESS MACHINES CORPORATION, Armonk, NY (US)

(72) Inventors: Zhan Peng Huo, Beijing (CN); Fei Tan, Beijing (CN); Lu Yan Li, Beijing (CN); Jiu Chang Du, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 17/716,398

(22) Filed: Apr. 8, 2022

(51) Int. Cl.
  *G06F 3/06* (2006.01)
  *G06F 8/65* (2018.01)
  *G06F 11/00* (2006.01)
  *G06F 11/14* (2006.01)

(52) U.S. Cl.
  CPC .............. *G06F 3/0607* (2013.01); *G06F 8/65* (2013.01); *G06F 11/004* (2013.01); *G06F 11/1441* (2013.01); *G06F 3/0643* (2013.01)

(58) Field of Classification Search
  CPC .. G06F 11/004; G06F 11/1441; G06F 3/0643; G06F 8/65; G06F 3/0607
  See application file for complete search history.

(56) References Cited

U.S. PATENT DOCUMENTS

| 5,819,292 A | * | 10/1998 | Hitz | ....................... | G06F 16/174 |
| | | | | | 707/999.203 |
| 7,694,191 B1 | * | 4/2010 | Bono | .................... | G06F 11/004 |
| | | | | | 714/48 |
| 9,569,460 B1 | * | 2/2017 | Yadav | ................... | G06F 3/0643 |
| 10,534,671 B1 | | 1/2020 | Zhao | | |

(Continued)

FOREIGN PATENT DOCUMENTS

CN  114138414 A  3/2022

OTHER PUBLICATIONS

KR 20040080429, "Providing a Snapshot of a Subset of a File System", (translation), Sep. 18, 2004, 45 pgs <KR_20040080429.pdf>.*

(Continued)

*Primary Examiner* — Tuan A Vu
(74) *Attorney, Agent, or Firm* — Michael A. Petrocelli; Christopher M. Pignato

(57) ABSTRACT

Intelligent layer control for building image files into new container images while avoiding redundant files stored between read-write and read-only image layers. Pre-commit processing module (PPM) filters updated files. Hash values of updated files are compared with hash values of original files. Where hash values are the same, PPM generates an OMD file that updates the inode metadata of original files with metadata of the updated file and removes the updated file. Hash values that are not the same, with differ values less than a threshold value, PPM generates an OMD file with (Continued)

updates to the inode metadata, content change flag and/or delta content info reflecting the updated file and removes updated file from container file system. OMD files are passed to storage driver whereby metadata and/or changes to content are overridden and merged with original file content generating a single unified user view of the container file system.

20 Claims, 11 Drawing Sheets

(56) References Cited

U.S. PATENT DOCUMENTS

| | | | |
|---|---|---|---|
| 11,029,976 | B2 | 6/2021 | Wong |
| 2013/0006939 | A1* | 1/2013 | Hinrichs, Jr. ....... G06F 11/1441 707/639 |
| 2018/0095973 | A1 | 4/2018 | Huang |
| 2018/0267990 | A1 | 9/2018 | Cherukuri |
| 2020/0341963 | A1 | 10/2020 | Kreutzer |
| 2021/0004251 | A1 | 1/2021 | Skourtis |
| 2022/0075760 | A1 | 3/2022 | Wu |

OTHER PUBLICATIONS

Ye Mao, CN 104714755, "A Snapshot Management Method and Device", (translation), Jan. 3, 2020, 35 pgs <CN_104714755.pdf>.*

International Searching Authority, "Notification of International Search Report and Written Opinion or Declaration", International Application No. PCT/CN2023/086505, dated May 23, 2023, 8 pages.

"Wagoodman / dive: A tool for exploring each layer in a docker image", GitHub, downloaded from the internet on Mar. 7, 2022, 17 pages, <https://github.com/wagoodman/dive>.

Mell et al., "The NIST Definition of Cloud Computing", Recommendations of the National Institute of Standards and Technology, Special Publication 800-145, Sep. 2011, 7 pages.

Sakuragi, Hanamichi, "Slimming Down Your Docker Images", Morioh, downloaded from the internet on Nov. 27, 2021, 13 pages, <https://morioh.com/p/8370b39fdf4c>.

Skourtis et al., "Carving Perfect Layers out of Docker Images", Usenix.org, HotCloud '19, 8 pages.

Sun et al., "BAOverlay: A Block-Accessible Overlay File System for Fast and Efficient Container Storage", SoCC 20, Oct. 19-21, 2020, Virtual Event, USA, 15 pages.

Zhao et al., "Slimmer: Weight Loss Secrets for Docker Registries", 2019 IEEE 12th International Conference on Cloud Computing (CLOUD), Jul. 2019, pp. 517-519.

* cited by examiner

INTELLIGENT LAYER CONTROL OF REDUNDANT CONTENT IN CONTAINER IMAGES

BACKGROUND

The present disclosure relates generally to the field of building and modifying container images and more specifically, controlling the presence of redundant files between read-write layer and read-only layers of images used to build or modify containers.

Container platforms operating within cloud computing environments have been widely adopted to build, share and run applications. A container is a standard unit of software that packages the software code and all of the dependencies of the software within a self-contained package, allowing the application to run quickly and reliably in a plurality of computing environments. Multiple containers can run on the same infrastructure and share the same operating system (OS) kernel with other containers, with each running as an isolated process in user space. Containers are built from images which become containers at runtime. The container image is a lightweight, standalone executable package of software used to run an application and can include code, runtime, system tools, libraries and settings. Containers isolate the software from the surrounding environment, ensuring that the software runs in the same manner and uniformly across environments, regardless of the infrastructure running the container.

Image files used for running containers are built up as a series of layers. Each layer represents an instruction within the image's template or text file used to build the image itself. For example, when using the Docker platform to build images, a Dockerfile is used as the template to build the image. Each layer of the image file comprises only a set of differences from the layer before it. Adding and/or removing files of the image results in a new layer. The layers are stacked on top of each other and each time a new container is created from the image, a new writable layer (referred to as the "container layer) is added on top of the underlying read-only layers. All changes made to the running container, such as writing new files, modifying existing files, and deleting files, are written to the thin writable container layer.

Storage drivers manage the contents of the image layers and the writable container layer. The storage drivers use a copy-on-write (CoW) strategy to try and maximize storage efficiency by sharing and copying files or directories from lower layers to another layer (including the writable layer) within the image. Limitations on storage technology and lack of image building skills can cause the use of CoW operations to become problematic over time as images being built can easily grow to unpredictable sizes, consuming lots of storage resources. Each time images are changed during the build process, the size of the image can increase even when no additional files are added to the image. CoW triggers a copy-up operation each time a file is modified. For example, by opening a file with WRITE permission, changing attributes of a file, renaming a file, creating a hard-link of a file, editing file content, etc. Due to the copy-up operations of a CoW strategy, the same file may be present many times within an image file at multiple layers as each new layer results in the same file being copied up to a new layer. Embodiments of the present disclosure recognize the limitations of using CoW to build container images and how easily file sizes of the images can expand very quickly, even when there are only minimal changes to the actual files present within the image layers. An image building and storage solution is therefore needed that provides a storage friendly image layout which can analyze files between image layers, store only the minimum number of changes to files within the image and align the current user's view of the image and container with the files intended to be accessible and viewable to the user.

SUMMARY

Embodiments of the present disclosure relate to a computer-implemented method, an associated computer system and computer program products for building or modifying image files for containers. The computer-implemented method comprises the steps of inspecting, by a daemon, files or directories of a container file system of the image file for changes to the files or the directories; in response to inspection of the container file system containing changes to the files or the directories, filtering, by the daemon, an updated file copied-up into a read-write layer of the image file; comparing, by the daemon, a hash value of an original file of the container file system from a lower, read-only layer of the image file with a hash value of the updated file. In response to comparing the hash value of the original file with the hash value of the updated file, the hash value of the original file and the hash value of the updated file are the same or a difference between the hash value of the original file and the hash value of the updated file exceeds a default differ value, generating, by the daemon, an override and merge data (OMD) file comprising an override block and a merge block; updating, by the daemon, metadata of the override block from inode metadata of the original file stored in the lower layer of the image file to metadata of the updated file; and removing, by the daemon, the updated file from the container file system.

Embodiments of the computer-implemented method associated computer system and computer program products for building or modifying image files into new images for deployment as a container may further compare differences between the hash value of the original file and the hash value of the updated file to determine whether the difference exceeds a default differ value (a threshold value). In response, the computer-implemented method further comprises updating, by the daemon, the merge block of the OMD file with delta content information indicating content has changed between the original file and the updated file, and a pointer indicating a storage area containing delta content.

In some embodiments, a storage driver of the daemon can scan the image file for each file present within the read-write layer. Upon detecting an OMD file within the read-write layer, the storage drive parses the OMD file for a content change flag within the merge block and upon identifying the content change flag within the OMD file has a value of true, the storage driver merges content of the original file with delta content of the OMD file, making the content and delta content viewable to the user.

Furthermore, upon parsing the OMD file and identifying the content change flag within the OMD file has a value of false, the storage driver can make the content of the original file viewable to the user and override the inode metadata of the original file with metadata of the override block of the OMD file, making the metadata of the override block viewable to the user. In some embodiments, the storage driver can not only override the inode metadata of the original file with metadata of the override block of the OMD file, but also merge the delta content of the merge block of the OMD file and the content of the original file from the lower layer, making both the content of the original file and the delta content of the OMD file viewable to the user.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
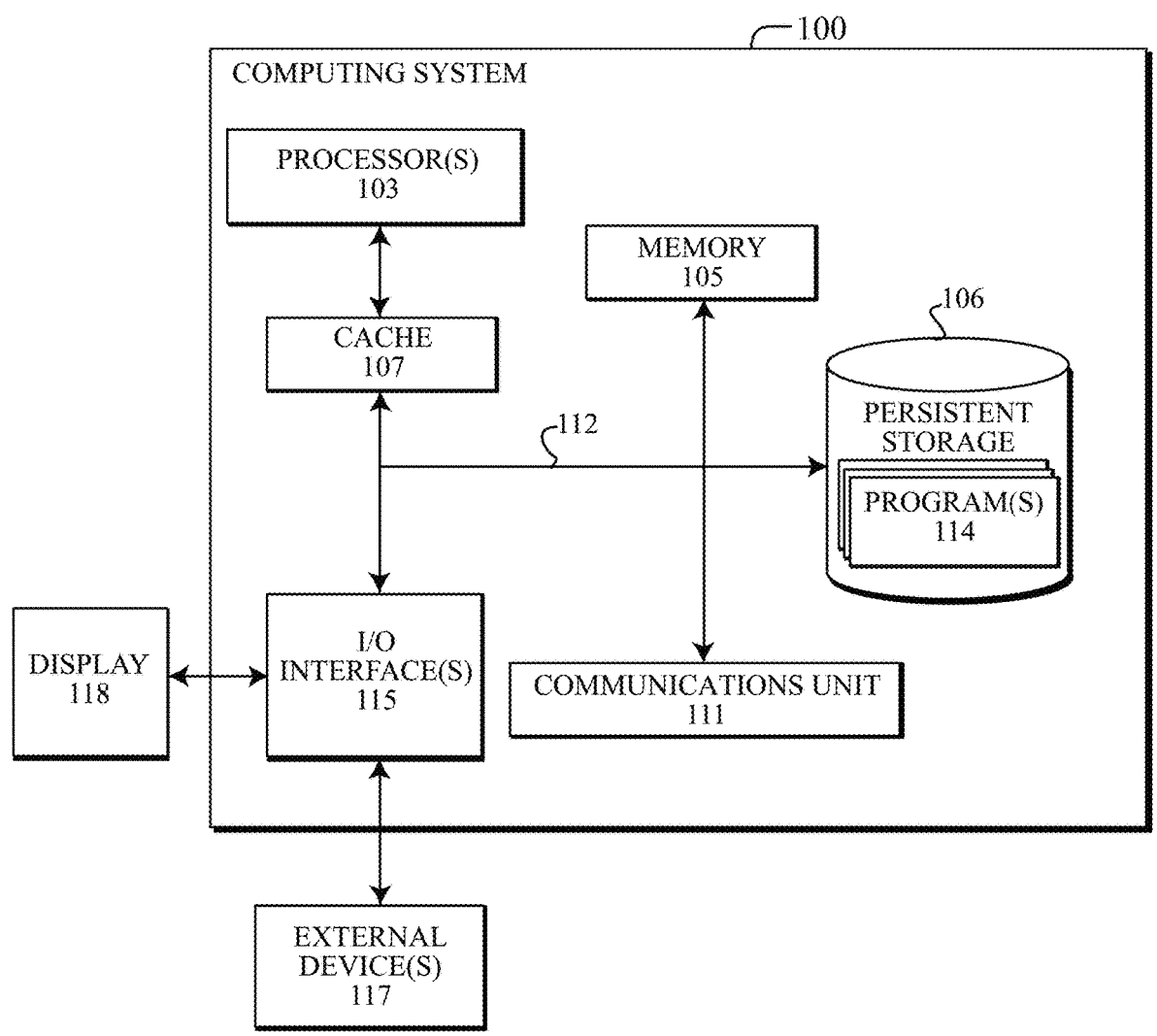
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Embodiments of the present disclosure can be a computer-implemented method, system and/or computer program product for building and/or modifying image files into new container images for deployment as containers. Embodiments of the present disclosure utilize intelligent layer control while building or modifying images which can avoid storage of redundant files between read-write and read-only layers of the images being built or modified using another base image. A daemon of a container operating system can receive a build request or request to modify an existing image file and upon receipt of such a request, the daemon can pull and deploy the base image being used to create the new image.

Base images deployed as a container, and prior to executing a commit operation that commits the changes of the base image to a new image, may trigger a pre-commit processing module (PPM) of the daemon when the container file system of the image file contains changes to the files of the file system. Once triggered during the pre-commit phase, the PPM may execute a filtering operation that filters updated files that may have been copied-up to the read-write layer of the image and as a result of a change to the file, deviates from the original files positioned in lower, read-only layers, of the image. Updated files may be filtered based on the type of file, the size of the file or other properties, parameters and/or attributes. Once filtered, embodiments of the PPM may compare hash values of the original file from the lower read-only layer of the image to the hash value of the updated file copied up to the read-write layer. If the hash values are the same, this may indicate that the metadata of the updated file has changed from the original file. The PPM may generate an override and merge data structure (OMD) file.

As part of the OMD file generation, the PPM may update the inode metadata of the original file to the metadata of the updated file and store the metadata of the updated file to an override block of the OMD file. The PPM can remove the updated file from the container file system using a rm command or other removal method. The newly generated OMD file may be provided to a storage driver OM plugin, allowing the storage driver to place the OMD file in the read-write layer (i.e., the container layer) for the commit operation whereby the metadata of the OMD file can override inode metadata provided by the original file positioned within the lower layer of the existing image file. As a result of the commit operation, the read-write layer is added as a new top layer of a new image.

In some instances, whereupon comparing the hash values of the original file and the updated file, the difference between the hash values may be measured against a default differ value (threshold value) which can be manually set by a user or administrator. In situations where the difference between the hash values exceeds the default differ value, a standard CoW and commit operation can be executed to commit the file changes of the image file to the new image since the file changes in the updated file may be large and/or extensive compared with the original file of the read-only layer. Likewise, when the comparison of hash values between the original file and the updated file do not exceed the threshold set by the default differ value, the PPM can generate an OMD file comprising the updated metadata of the updated file, overriding the inode metadata of the original file as discussed above. Furthermore, the OMD file may also include a content change flag indicating whether content of the updated file differs from the original file, and a delta pointer indicating a storage location of the change in content (the delta content) that differs from the original file. Upon generation of the OMD file, the PPM can remove the updated file from the container file system of the image file and provide the OMD file to the storage driver OM plugin for placement into read-write layer of the container.

Embodiments of the storage driver OM plugin can use the OMD file and image layering to provide a single unified view of the image to the user. For example, the Union Filesystem of the container can guarantee which content of the container the user can see. The filesystem can generate the user view from the container layer and lower read-only. For example, by mapping files from the lower layers of the image file to the container layer, and/or place one or more whiteout files in the container layer to obscure the existence of files in the read-only layer that have been deleted. Embodiments of the storage driver may run override and merge operations using the OMD files and files of the read-only layer to minimize the use of disk space consumed by new image being created. Embodiments of the storage driver may scan the container layer for OMD filenames (i.e.., .om.filename) placed by the PPM. Detected OMD files can be parsed by the storage driver for a content change (CC) flag having a value of true or false. If a CC flag is not present within the merge block of the OMD file (i.e., a value of "false"), the storage driver can copy up the file content from the original file in the lower layer of the image to the container layer and override the metadata info of the original file with the metadata within the override block of the OMD file.

Likewise, where a parsed OMD file does comprise a CC flag with a value of "true", the delta content referenced in the OMD file's merge block can be merged with content of the original file from the lower layer of the image file, and both content and delta content can be viewed by the user. Moreover, the metadata of the OMD file can override the inode metadata of the original file, wherein the OMD file metadata is viewable to the user rather than the inode metadata. Once the container layer is finalized, the daemon can commit the container layer to the new image using a commit operation to generate the new image, wherein the container layer is written as the new top layer (read-only) of the new image.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, and virtualized computer systems, including systems with container-oriented architecture, and microservice-oriented architecture. For example, computing system 100 can take the form desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more clusters, pods or containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or accessed by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
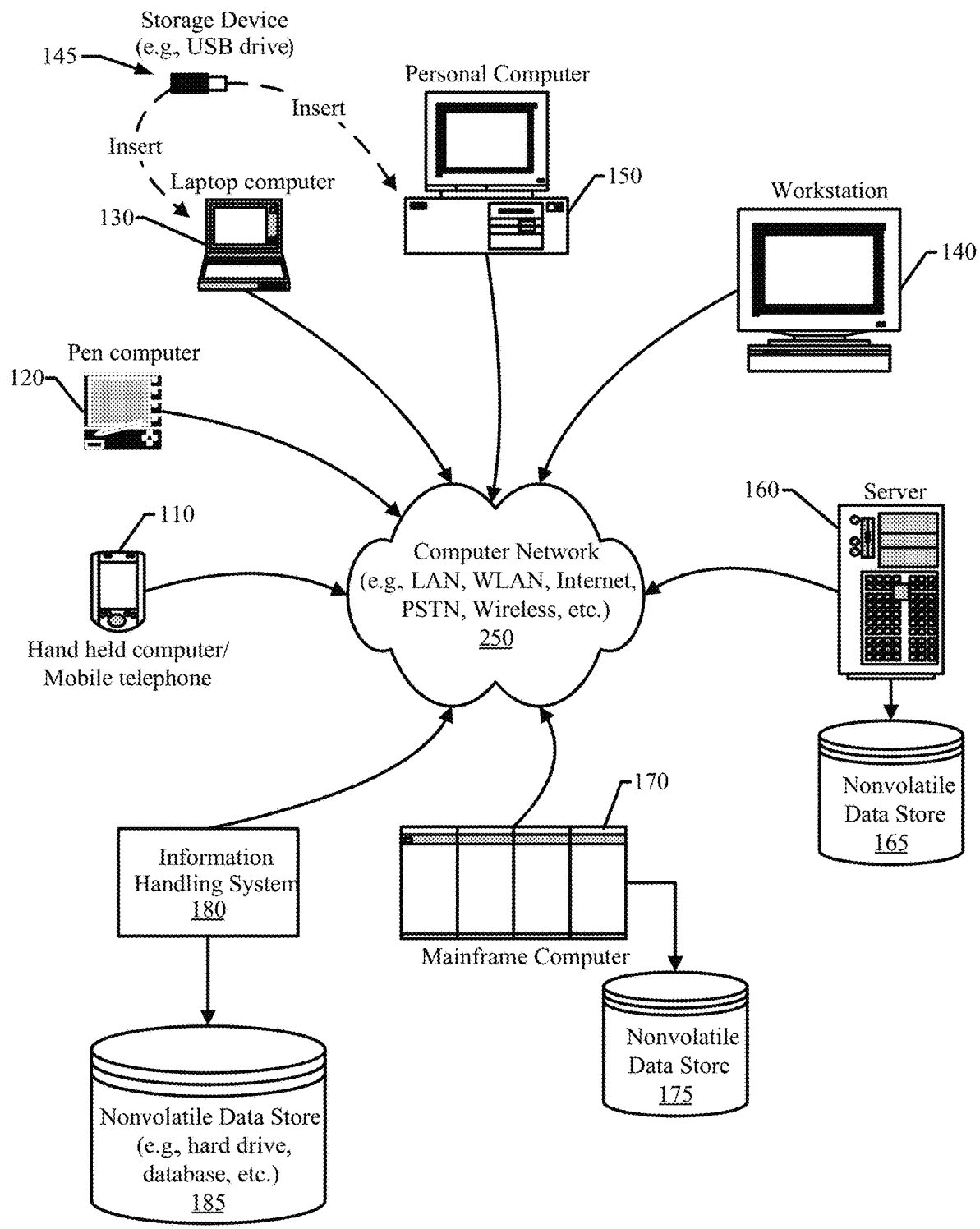
FIG. 2 depicts a block diagram illustrating an extension of the computing system environment of FIG. 1, wherein the computing systems are configured to operate in a network environment and perform methods described herein in accordance with the present disclosure.

FIG. 2 illustrates an extension of the computing system 100 environment shown in FIG. 1 depicting that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
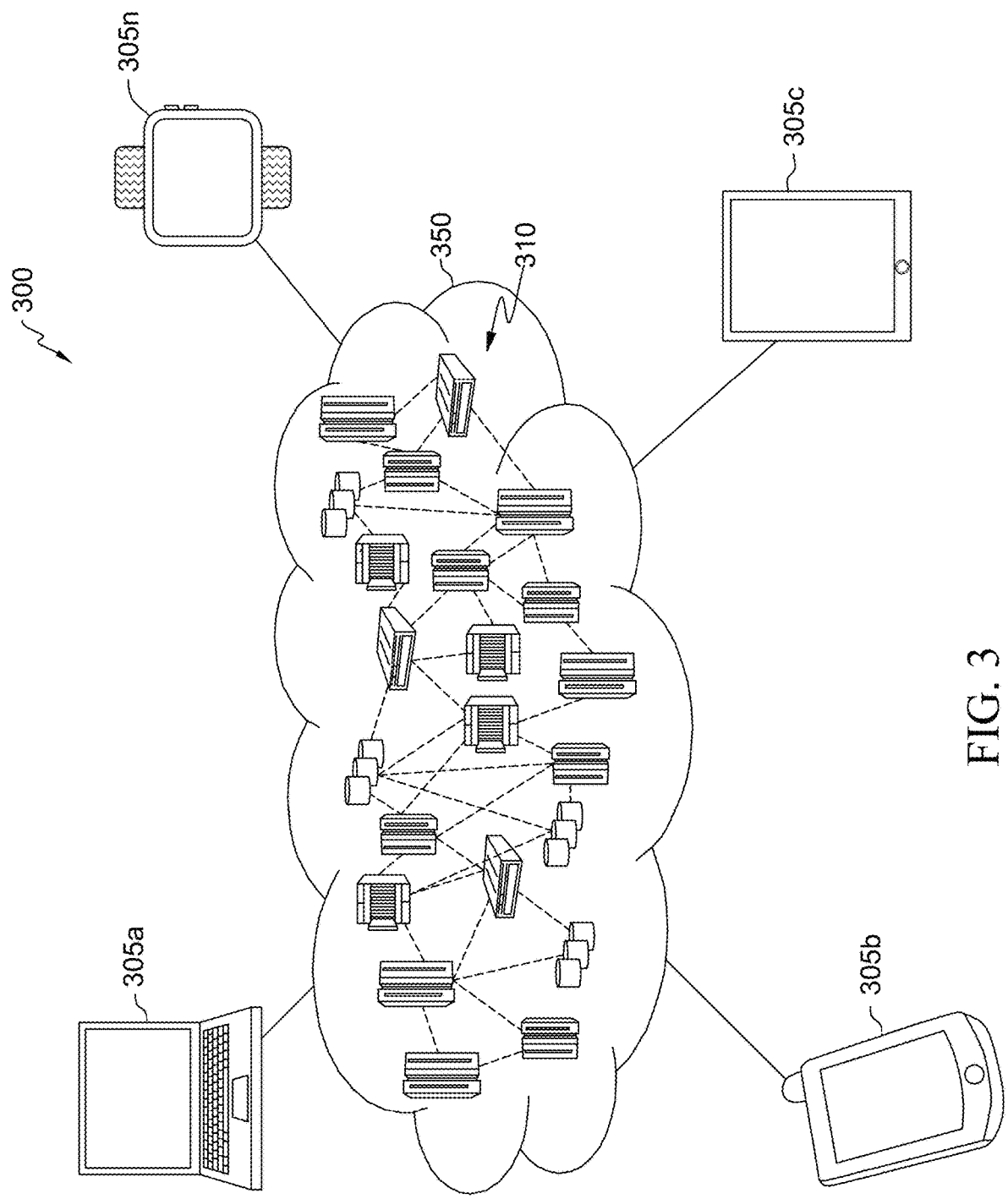
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which user device(s) 305*a*-305*n* (referred to generally herein as end user device(s) 305), may be used by cloud consumers to access one or more software products, services, applications, and/or workloads provided by cloud service providers or tenants of the cloud network 350. Examples of the user device(s) 305 are depicted and may include devices such as a desktop computer, laptop computer 305*a*, smartphone 305*b* or cellular telephone, tablet computers 305*c* and smart devices such as a smartwatch 305*n* and smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices shown in FIG. 3 are intended to be illustrative only and that computing nodes 310 of cloud computing environment 300 can communicate with any type of computerized device over any type of network and/or network addressable connection (e.g., using a web browser).

Figure 4:
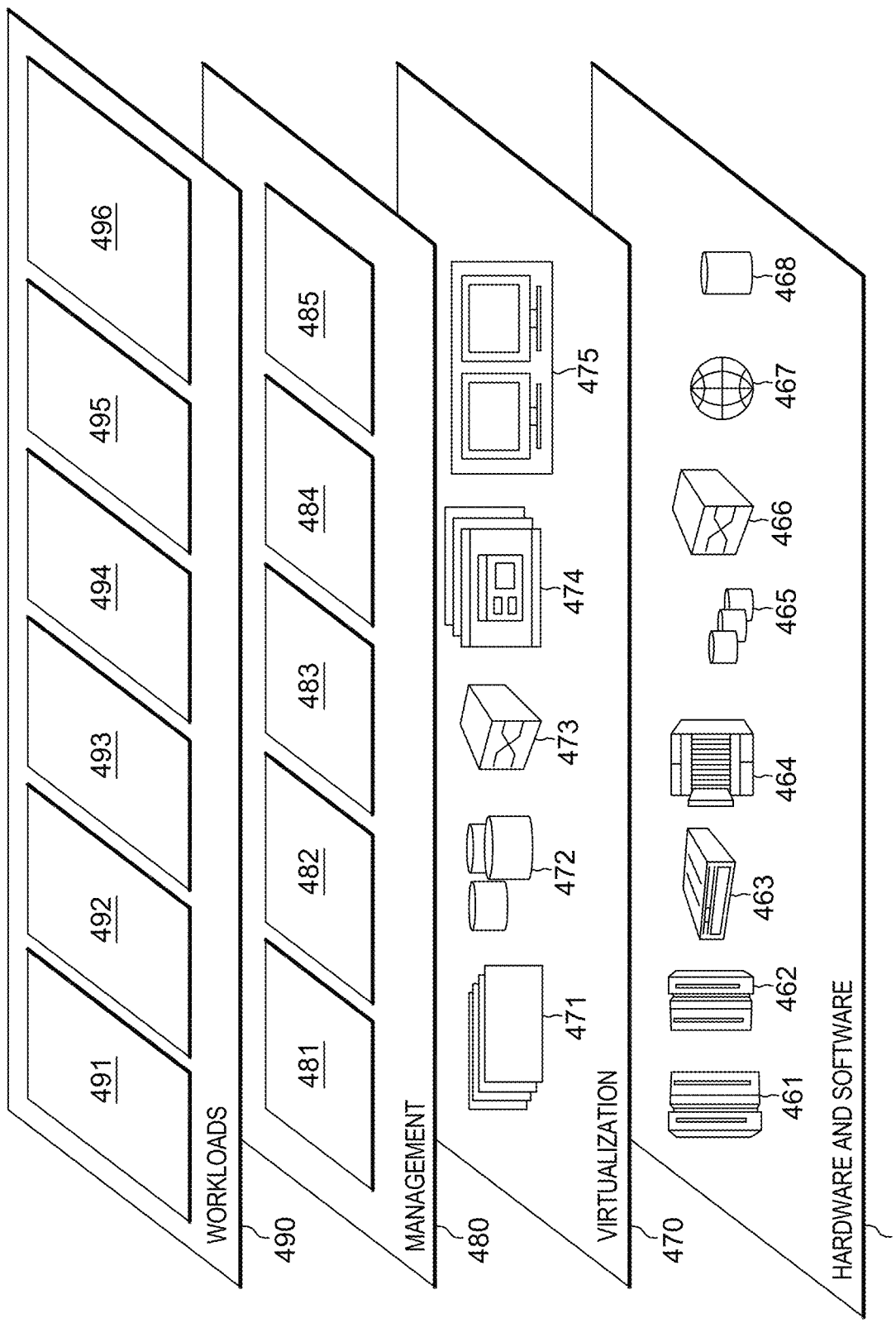
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized and deploy containerized workloads to users. Examples of workloads and functions which may be provided from this layer include software development and lifecycle management 491, data analytics processing 492, multi-cloud management 493, transaction processing 494; database management 495 and video conferencing 496.

System for Building and Modifying Image Files Using Intelligent Layer Control It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
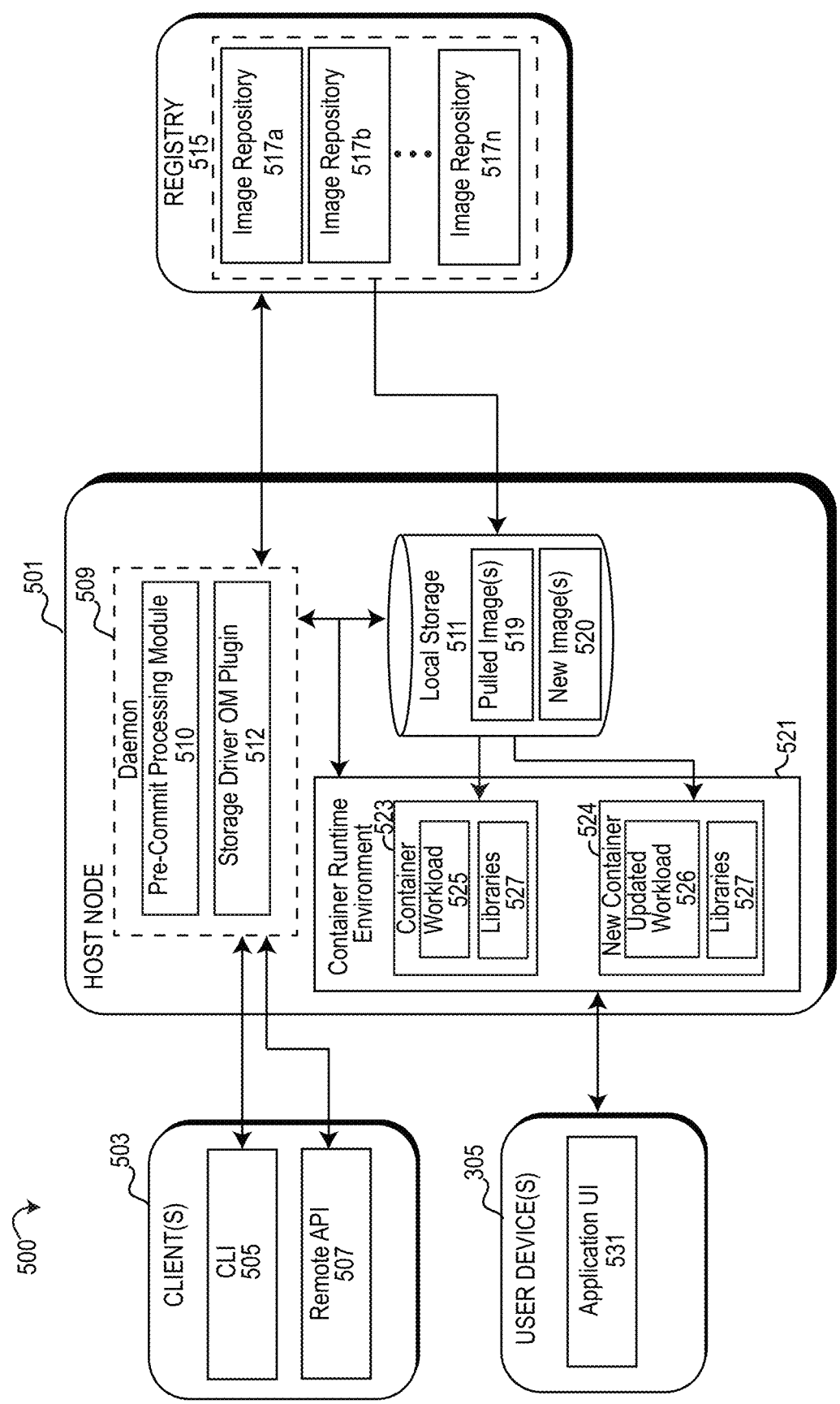
FIG. 5 depicts a functional block diagram describing an embodiment of a computing environment for building or modifying image files for deployment by containers, in accordance with the present disclosure.

Referring to the drawings, FIG. 5 depicts an embodiment of computing environment 500 capable of building and modifying images 519, 520 using intelligent layer control, for deployment as containerized workloads 525 running within a container runtime environment 521 of a host node 501. As depicted in the exemplary embodiment of FIG. 5, the computing environment 500 of the container system may comprise a plurality of components placed in communication with one another. For example, in the exemplary embodiment, computing environment 500 includes components such as one or more client(s) 503, host node 501, registry 515 and/or user device(s) 305. Client(s) 503 may be a primary way for administrators and users running and managing the container system to interact and communicate with each daemon 509. Client(s) 503 may send commands to daemon 509 via a command line interface (CLI) 505 and/or a remote API 507 (such as a REST API) over a network interface and/or over UNIX sockets instructing daemon 509 to execute the commands. Examples of commands that may be submitted by client(s) 503 may include (but are not limited to) the "build", "pull", "push", and "run" commands. Although FIG. 5 depicts client(s) 503 communicating with a single daemon 509, embodiments of client(s) 503 may communicate with more than one daemon 509 process, which may be running on a single host node 501 or running across a plurality of host nodes 501. Moreover, client(s) 503 may reside on the same host node 501 as daemon 509 or may reside on a remote host placed in communication with one or more daemon 509.

Host node 501 may be described as a computing system 100 (physical or virtual) hosting daemon 509. Example of a host node 501 can be any computing system 100 as described above, including laptops, desktops, servers, virtual machines thereof and/or computing resources provided by a cloud network 350. Daemon 509 may listen for incoming commands and API requests from client(s) 503 and manage objects of the container system, including images, containers 523, networks and storage volumes (such as local storage 511). Daemon 509 may be responsible for building and running containers 523 from images within a container runtime environment 521. An image may refer to a read-only template comprising instructions for creating a container 523. Images may be composed of layers of images that can be cached on the host node 501 and shared across a plurality of containers 523. Embodiments of containers 523 may be described as a runnable instance of an image. Containers 523 can be created, started, stopped, moved or deleted by the client(s) 503 using the CLI 505 or remote API 507. Containers 523 can be connected to one or more networks, persistent storage 106 (such as local storage 511 and/or other nonvolatile data stores 165, 175, 185). Containers 523 can even be created into a new image(s) 520 based on the current state of a container 523. Containers 523 may be defined by its image as well as any configuration options provided to the container when the container 523 is created or started. When containers 523 are removed, any changes to the state of the container 523 that are not stored in persistent storage 106 may disappear.

Image files used to create containers 523 may be built and modified by users of the container system or others who may share image files publicly or privately. Image files can be published to a registry 515, where the images can be stored in one or more image repositories 517*a*, 517*b* . . . 517*n* (referred to generally herein as "image repository 517") such as an image library. A registry 515 may be part of host node 501 or an external location outside of the host node 501 and may include pointers indicating the storage location of the image files within one of the image repositories 517. Embodiments of a registry 515 can be a public registry or a private registry. Upon execution of a build, pull or run command the daemon 509 can retrieve a requested image from registry 515 and store the pulled image(s) 519 locally in local storage 511 of the host node 501. In contrast, when a push command is executed by a client(s) 503, a previously pulled image 519 or new image 520 can be sent from local storage 511 to a registry 515 and stored by one or more image repositories 517.

Embodiments of a daemon 509 may be instructed to build a new image from an existing base image or run an instance of an existing image. Upon execution of the command by a client(s) 503, daemon 509 can pull the image needed to fulfill the client's 503 request from a registry 515 and deploy an instance of the image as a container 523. If the image already resides on local storage 511, the previously pulled image 519 can be executed without needed to re-pull the image from registry 515. Upon running the pulled image 519, daemon 509 may create one or more container 523 within the container runtime environment 521. Container 523 may comprise all applications needed for a workload 525 and the associated libraries 527 needed to run the workload 525 of the container 523. User device(s) 305 may access and use the running workload(s) 525 or updated workload 526 of the container runtime environment 521 via a user interface (UI) of an application such as application UI 531 as shown in FIG. 5.

Embodiments of systems configured to build or modify image files, such as the system depicted in computing environments 500, may include a pre-commit processing module 510 and a storage driver OM plugin 512. The term "module" may refer to may refer to a hardware module, software module, or a module may be a combination of hardware and/or software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more computing systems 100 operating as part of the computing environments 500. Embodiments of the pre-commit processing module 510 and a storage driver OM plugin 512 may be integrated into a daemon 509 as part of the daemon process and/or as a plugin in some embodiments. In alternative embodiments, the pre-commit processing module 510 and/or the storage driver OM plugin 512 may be a separately running process within the memory 105 of the host node 501 and/or in remote communication with a host node 501.

Embodiments of the pre-commit processing module 510 (also referred to herein as "PPM 510") may be triggered prior to executing a commit operation and may be responsible for performing pre-commit functions. Pre-commit functions may be directed toward filtering updated files based on file size and/or file type, performing hash comparisons between original files and updated files positioned within the container layer 601 of the pulled image 519, as well as update inode metadata, CC flags and/or delta content info to generate OMD files 620. Embodiments of the storage OM driver plugin 512 (also referred to herein as "storage driver 512") receives the OMD file 620 generated by PPM 510 and places the OMD file 620 into the container layer 601 to undergo a commit process whereby the OMD file 620 can be committed to the new image file as part of a new image layer. Storage driver 512 may parse the OMD file 620 for file content 723 changes between the original file and updated file of the image, merge delta file content 623 of the updated file with the delta file content 623 of the original file, override file inode metadata 721 of the original file to show the latest file metadata 621 of the updated file within the user view 711 of the container 523, and apply whiteout files 603 to in order to obscure files intended to not be seen within the user view 711 of the container 523. Embodiments of the storage driver 512 may further apply the OMD file 620 to processes deploying a new image 520 to a new container 524.

Figure 6:
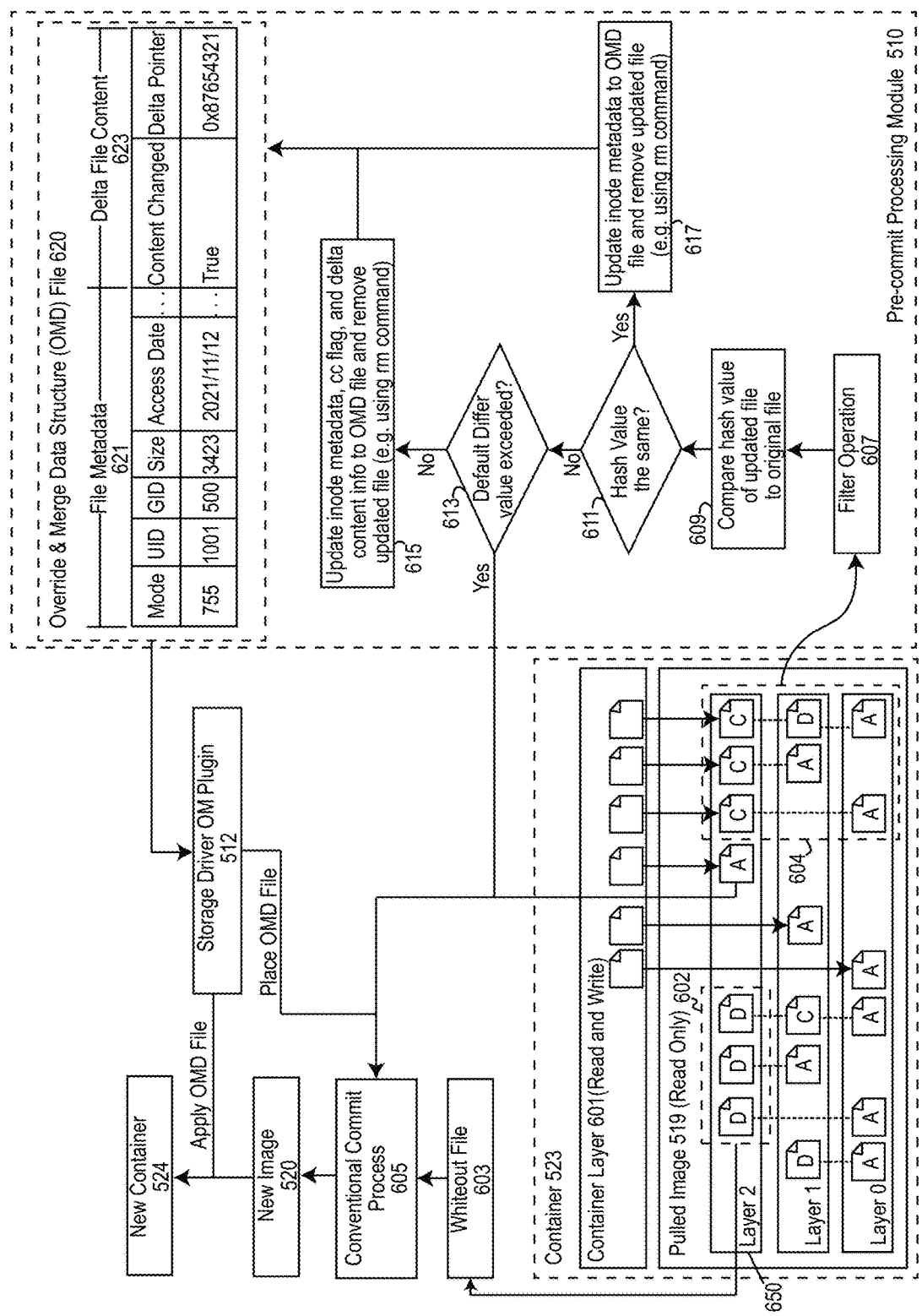
FIG. 6 depicts a high-level flowchart describing an embodiment of an architecture for building or modifying image files for deployment by containers and the workflow between components of the architecture, in accordance with the present disclosure.

FIG. 6 provides a detailed illustration describing an architecture and process by which daemon 509 may create a new image 520 for deployment as a new container 524 from a pulled image 519 currently deployed as a container 523. In other embodiments however, the process depicted may also be applied to building a new image using a template file (i.e., such as a Docker file or other text file containing build instructions). The embodiment demonstrates the daemon 509 operating by intelligently controlling the files of the image files existing within layers 0, 1, 2 using a PPM 510 and storage driver 512 as shown to reduce redundant files between the container layer 601 (read-write) and the read-only layers 0,1,2 of the pulled image 519. Embodiments of PPM 510 during a pre-commit stage of building or modifying an image file may inspect the container 523 filesystem for changes to files or directories. For example, in Docker, a docker diff command may be used specifying the container ID of the container being inspected. Inspection of the container 523 may list the changes to the files and directories of the container's filesystem since the container 523 was created. An example of an inspection of the filesystem of container 523 is shown in FIG. 6, wherein files depicted with an "A" represent an addition of a file or directory at the particular layer. Files depicted with a "D" indicates a file or directory that was deleted, and files depicted with a "C" indicates a file or directory that has changed from the file in the previous layer.

Embodiments of the PPM 510 may apply a filter operation 607 to the files or directories of the image file that are designated during the inspection to include a change to the file or directory in the read only layers (layer 0, layer 1 and layer 2) of the image file being copied-up into the container layer 601. As shown in FIG. 6, upon inspection of the pulled image 519 being used as the base image for creating a new image 520, layer 2 is the top layer 650 of the pulled image 519 and includes three files or directories being copied up into the container layer 601 marked with having changes compared with the files of the read-only lower layers (i.e., layer 1 or layer 0) which may be referred to as the original files. The filtering operation 607 may be applied to updated files being copied-up to the container layer 601 according to the type of file and the size of the file. As shown in FIG. 6, filtered group 604 comprises updated files within the top layer 650 being copied up into container layer 601 and are therefore selected for filtering and additional pre-commit processing by PPM 510 before committing a container's 523 file changes into a new image 520; whereas newly added files present in the top layer 650 can be copied up to the container layer 601 and committed by the daemon 509 using a conventional commit process 605 without being pre-processed by PPM 510. Moreover, some files or directories within the top layer 650 are not copied up to the container layer 601. For example, files within group 602 that are being deleted in layer 2 are applied with a whiteout file 603 to prevent the deleted files being copied up and viewable within the container layer 601. Once the whiteout file 603 is applied, the daemon may proceed to commit to the changes where the whiteout files 603 are applied by submitting the deletion actions to the conventional commit process 605.

The filtered group 604 of files being processed during the pre-commit stage by PPM 510 may undergo a hash value comparison step 609. During the hash value comparison step 609 of the processing during the pre-commit stage, PPM 510 may, for each file or directory identified within the read-only layer as being changed from an original file (positioned within a lower layer 709 of the image file), compare hash values of the updated file being copied up to the container layer 601 with the original file from the lower layer 709 of the image. In step 611, PPM module 510 can determine, based on the comparison of hash values in step 609, whether or not the hash values of the updated file and the original file are the same. In situations where the updated and original files have the same hash values, PPM 510 may proceed to step 617, wherein PPM 510 generates an OMD file 620 and updates the file inode metadata 721 of the original file within the lower layer 709 of the pulled image 519 to the updated file metadata 621 of the updated file. Following the generation of OMD file 620 and applying the update to the file inode metadata 721, PPM 510 may remove the updated file from the container's file system.

Alternatively, if during the comparison of hash values during step 609, PPM 510 detects that the hash values of the original file and the updated file are not the same in step 611, PPM 510 may further compare as depicted by step 613, the difference in hash values (i.e., the differ value) to a threshold value that may be set by default and/or by a user or administrator of the container system (default differ value). Under circumstances where the differ value between the hashes of the original file and the updated file exceeds the threshold value, the changes or settings within the updated file can be committed to the new image 520 using a conventional commit process 605. However, if the threshold value is not exceeded by the difference between the hash value of the original file and the hash value of the updated file, PPM 510 may proceed to step 615 and generate an OMD file 620. Within the OMD file 620, PPM 510 can update the file inode metadata 721 to the file metadata 621 of the updated file, as well as update the OMD file 620 with a CC flag to a value of true and a delta pointer indicating a location of dela content that differs from the file content 723 of the original file of lower layer 709. Once the OMD file 620 is generated and updated, the updated file that has been processed by PPM 510 can be removed by PPM 510. For example, by using a rm command to remove or unlink files or directories from the updated file. OMD files 620 created by the PPM 510 can be provided to the storage driver 512 placement into the commit process 605 and/or applied to the process of deploying a new image 520 as a new container 524.

Figure 7A:
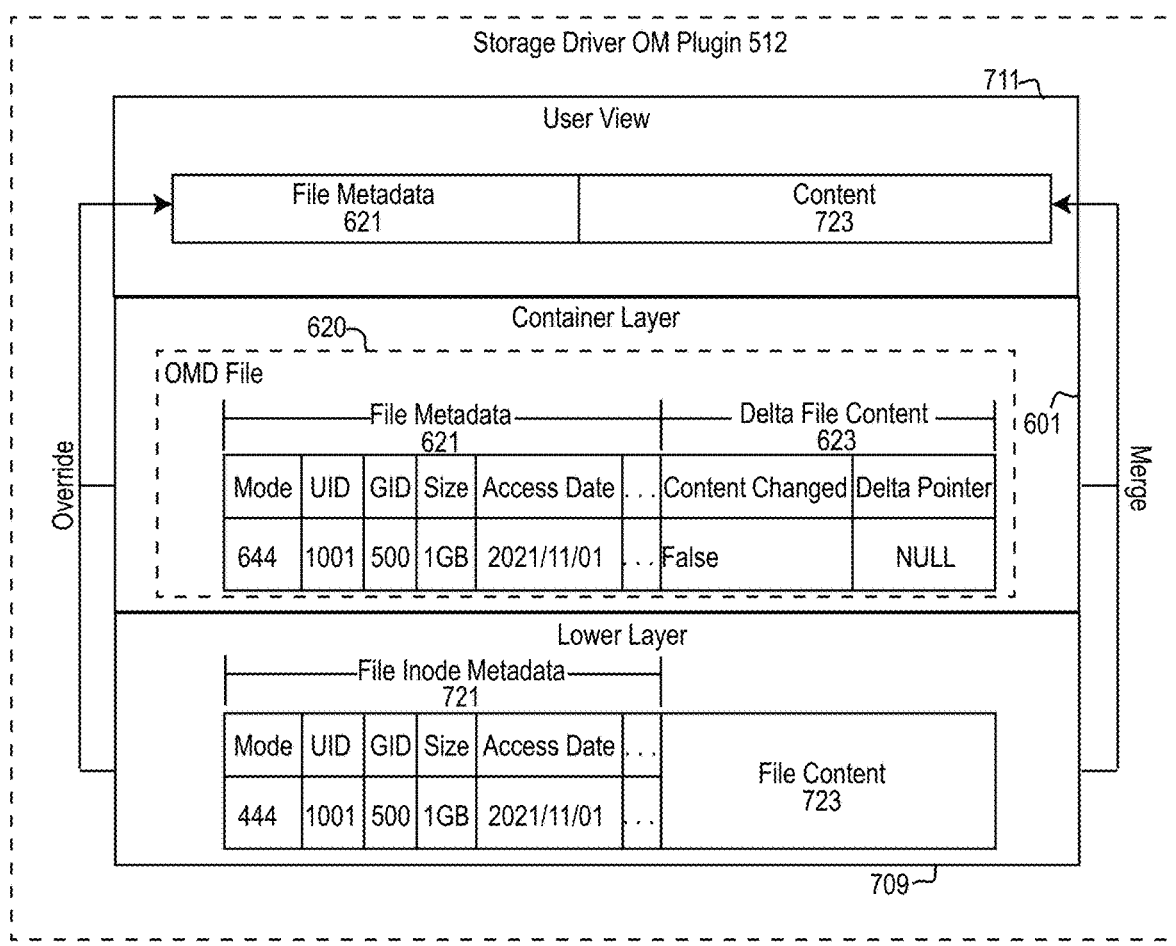
FIG. 7A depicts a functional block diagram describing an embodiment of a storage driver OM plugin performing an override&merge operation using an original file positioned within a lower layer of an image and an OMD file, in accordance with the present disclosure, wherein a content change between the original and updated files has not occurred.
Figure 7B:
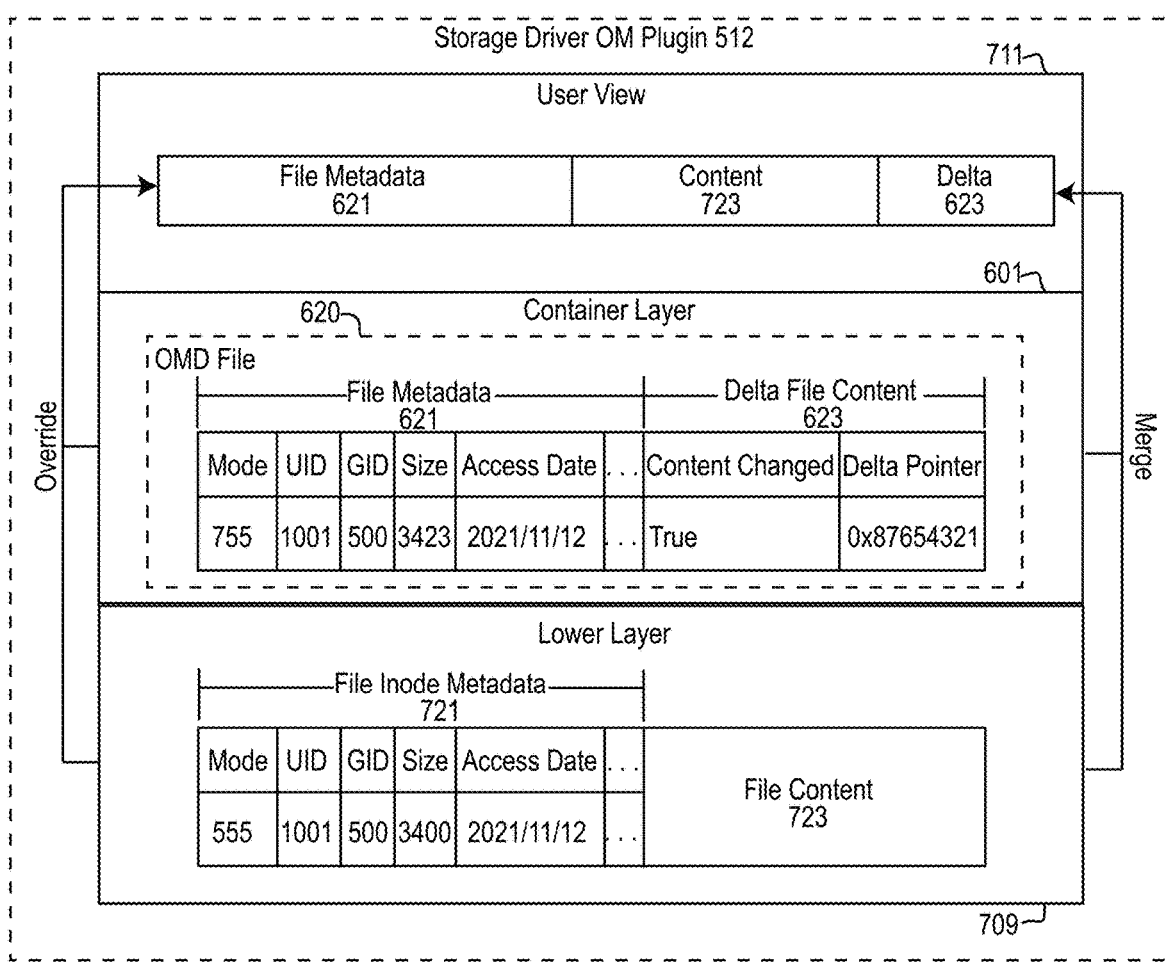
FIG. 7B depicts a functional block diagram describing an embodiment of a storage driver OM plugin performing an override&merge operation to create a final file from an original file positioned within a lower layer of an image and an OMD file positioned within the top layer of an image, in accordance with the present disclosure, wherein a content change between the original and updated file has occurred.

Examples of the structure of the OMD file 620 is shown in FIGS. 6-7B. Embodiments of OMD file 620 may include an override block and a merge block. The override block may contain file metadata 621 of the updated file used to generate the OMD file 620. Examples of metadata that may be tracked and stored by the file metadata 621 of the override block may include (but is not limited to) changes to the access mode, changes to the user ID (UID) and/or the group ID (GID), changes to the content size, re-saving the file resulting in an updated access date, etc. Embodiments of the merge block may include delta file content 623, which may include a content change flag indicating whether or not file content has changed between the updated file and original file; and a delta pointer which may point to the storage area containing the delta file content 623 that differs between the original file contents and the updated file contents.

Embodiments of the storage driver 512 may receive OMD files 620 from the PPM 510 and may place the OMD files 620 within the container layer 601 of the image file, replacing the updated file removed by PPM 510. Embodiments of OMD files 620 may be differentiated from the original files and the updated files by the structure of the filename. Embodiments of an OMD file 620 may use an ".om." prefix before the name of the file. For example, the file may be named .om.filename wherein "filename" may be any name for the file that the user has chosen, and the "filename" portion of the file's name may be the same as the filename of the original file in lower layers and/or the updated file that has been replaced by the OMD file 620. For example, a file named "infer.log" that is generated as an OMD file 620 may be named ".om.infer.log".

Embodiments of the storage driver 512 can parse and apply the OMD file 620 to form a whole file that is available for the user to view and use once the new image 520 is created. Embodiments of the storage driver 512 can incorporate portions of the OMD file's 620 merge block and override block into a user view generated by the container's file system, by performing an "override&merge" function. Embodiments of the override&merge function may be implemented in two scenarios. The first scenario is where there is no change in the file content 723 and only a difference between file inode metadata 721 of the original file and file metadata 621 of the updated file exists, resulting in overriding the file inode metadata 721 with file metadata 621 stored by the OMD file 620. The second scenario that may apply the override&merge function may be when there are minor changes made to the content of the copy-up file (i.e., the updated file) of the read-only layer and the file content 723 of the original file, wherein the resulting updated file incorporating the change in content is large in size (for example, 100 mb, 500 mb, 1 gb or more in some instances).

The override operation of the override&merge function can be applied to metadata of the override block of the OMD file 620 and the original file. The override operation ensures that file metadata 621 of the OMD file 620 is within the container layer 601 being committed to the new layer of the new image 524 and that the user sees the file metadata 621 when the user view 711 is generated by the container's file system, instead of the existing file inode metadata 721 of original files. The merge operation on the other hand, may combine file content 723 of the original file with delta file content 623 of the OMD file 620, when a change in file content 723 has occurred as a result of the differences between the content of the original file and updated file which led to the generation of the OMD file 620. When file content 723 has changed, the merge block of OMD file 620 will comprise a content change flag indicating a change (i.e., a delta) to the file content 723 has occurred. The presence of a CC flag may be indicated with a value of "true", and a delta pointer may identify within the merge block a location where delta content has been stored. During merge operations, the file content 723 of the original file can be mapped to the container layer 601 alongside the delta file content 623 of OMD file 620 and made viewable by the container file system to the user via the user view 711. In situations where a CC flag is not present, there is no change to the file content 723, and thus only the file content 723 is available to be made viewable to the user within user view 711 by the container file system.

Embodiments of storage driver 512 can selectively apply the override&merge function to the files of the image by identifying within the read-write layer of the container, an OMD file 620. Storage driver may scan files of the container layer 601 for files comprising and a naming structure indicative of an OMD file 620. For example, by scanning for the .om. prefix in the file names (e.g., .om.filename). Any files mapped up to the container layer 601 with filenames names that do not indicate they are an OMD file 620 can be committed directly to the new image 520 by the daemon 509 using commit process 605. Files identified by the storage driver as OMD files 620 can be parsed for a CC flag. If a CC flag is not present within the OMD file 620, the file content 723 from the lower layer 709 is made viewable by the container file system to the user in user view 711, while also making file metadata 621 of the OMD file 620 available within user view 711 for viewing by the user.

FIG. 7A describes an example of the override&merge function in a scenario wherein the storage driver 512 prepares the container layer 601 for a commit process 605 into a new image 520 and the file system generate user view 711 from container layer 601 and lower layers 709 of the image file. The new image 520 resulting from the commit process 605 may include a combination of portions of the OMD file 620 and an original file positioned within the lower layer 709, wherein file content 723 has not changed between OMD file 620 and the original file. In this particular example, only the file inode metadata 721 has changed. As shown, only the mode of the original file positioned within lower layer 709 has changed from 444 to 644 in the file metadata 621 of the OMD file 620. The delta file content 623 of the OMD file 620 indicates that the CC flag has a value of "false" and a delta pointer that is NULL, indicating no change in file content 723 between the original file and OMD file 620. Upon the storage driver 512 performing the override&merge function, a user viewing the container file system through the generated user view 711 would see the file metadata 621 of the OMD file 620 and the file content 723 of the original file.

In contrast to FIG. 7A, FIG. 7B depicts the storage driver 512 performing an override&merge function wherein there is both a change in the OMD file 620 that differs from the file inode metadata 721 and file content 723 of the original file. First looking at the change between the file inode metadata 721 and the file metadata 621 of the OMD file, it is clear in this example that both the mode and the size of the files are different. As shown, the file metadata 621 indicates a mode with a value of 755 and a size of 3423 megabytes (mb), as opposed to the file inode metadata 721 of the original file which depicts a mode having a value of 555 and a size of 3400 mb. Accordingly, during the execution of the override&merge function, the file inode metadata 721 is overridden by the file metadata 621 of the OMD file 620, resulting in the file metadata 621 being mapped to the user view 711, while both the file content 723 and the delta file content 623 are mapped to the user view 711 as shown.

Figure 8A:
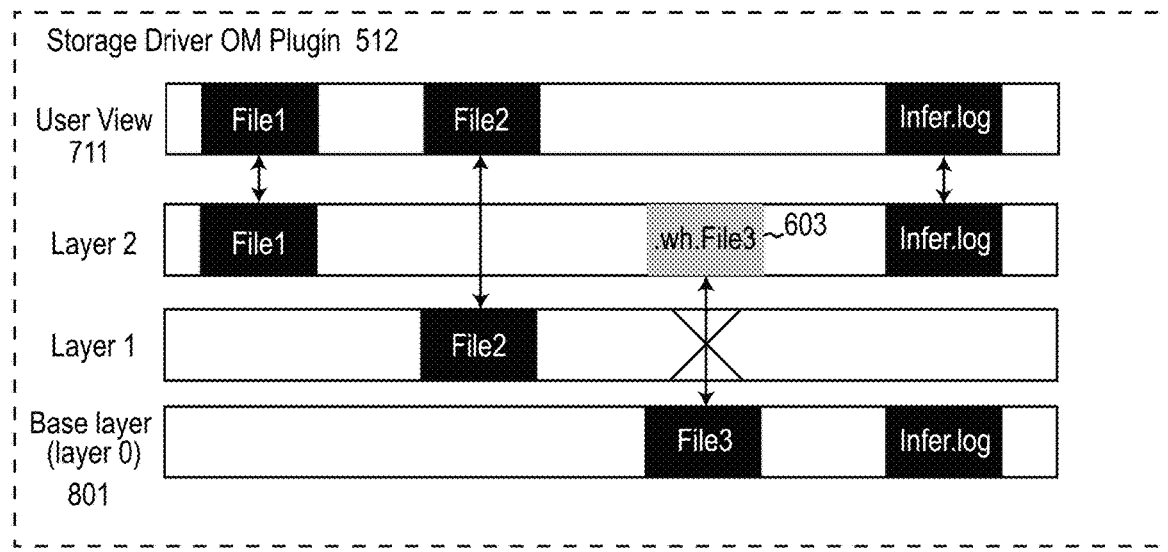
FIG. 8A depicts a functional block diagram describing an embodiment of a storage driver OM plug-in using copy-on-write to control how the layers of an image are stored and managed by a host node to provide a single unified view.

FIG. 8A provides an example of storage driver 512 applying copy-on-write operations to a container file system of an image file to create a single unified view within the user view 711 that can be committed to a new image 520. As shown in the Example of FIG. 8A, the base layer (i.e., layer 0) 801 of the file system contains file3 and infer.log which were part of the base image. When building a container image, infer.log may be a 1 gigabyte (GB) or larger file that exists in the read-only layer. During the changes made by the addition of layer 1, file 2 was added. In the most recent changes to the file system depicted in layer 2, file 1 was added, file3 was deleted, and a new or different copy of infer.log was added. As shown in the Figure, although file1 and file2 are within different layers, both are mapped from their respective layers to the user view 711 and can be made viewable to a user. File3 was deleted from the container's file system. To obscure file3 from user view 711, the storage driver 512 may place a whiteout file 603 in layer 2, preventing the original file3 in the base layer 801 from being seen or mapped to the user view 711. With regard to infer.log, the infer.log within layer 2 is a different copy than infer.log positioned within base layer 801. In this particular example the updated infer.log in layer 2 is shown to be mapped up to the user view 711 directly as opposed to creating an OMD file 620 and performing an override&merge operation. For example, the difference between the hash values of the updated infer.log in layer 2 and the original infer.log in base layer 801 may have exceeded the default differ value and therefore updated infer.log from layer 2 is mapped directly to the user view 711 in its entirety, rather than creating an OMD file 620 and running an override&merge function.

Figure 8B:
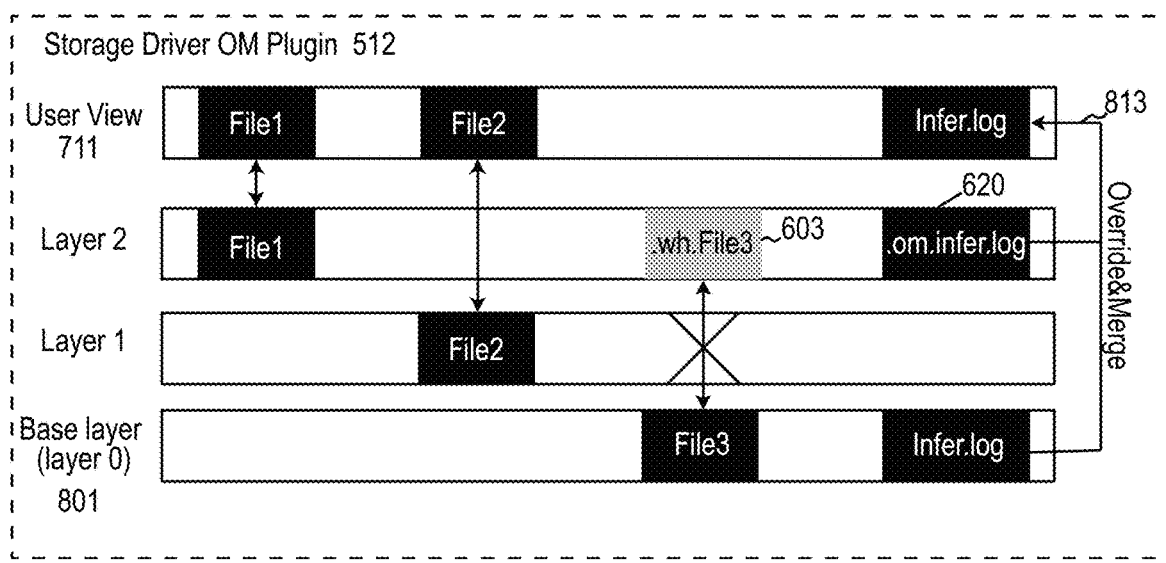
FIG. 8B depicts a functional block diagram describing an embodiment of a storage driver OM plug-in using copy-on-write to control how the layers of an image are stored and managed by a host node, including operations to override and merge an OMD file of the current layer with a file from a lower layer to a final file within a single unified user view.

FIG. 8B, depicts an alternative example to the example of FIG. 8A. Similar to FIG. 8A, in FIG. 8B, File1 and File2 are mapped to user view 711. File3 is deleted within the file system and thus a whiteout file (.wh.File3) 603 is placed within layer 2 obscuring file3 from being mapped to the user view 711, preventing a user from seeing File3 within the container's file system. Infer.log in the example of FIG. 8B differs because instead of the updated infer.log shown in FIG. 8A, an OMD file 620 has been inserted into the read-write layer (i.e., layer 2 in this example) by the storage driver 512. The presence of the OMD file 620 is recognized by the file name ".om.infer.log". As discussed above, instead of directly mapping .om.infer.log to the user view 711, the override&merge function 813 is performed using both the original infer.log positioned within base layer 801 and the .om.infer.log positioned within layer 2. As a result of the override&merge function 813, the "infer.log" made visible by the container filesystem within the user view 711 comprises at least the file metadata 621 of .om.infer.log along with file content 723 of the original infer.log positioned within base layer 801, and if a CC flag is present within .om.infer.log, then delta file content 623 may be made viewable as part of the infer.log visible to the user within user view 711.

Method for Building and Modifying Image Files Using Intelligent Layer Control

Figure 9A:
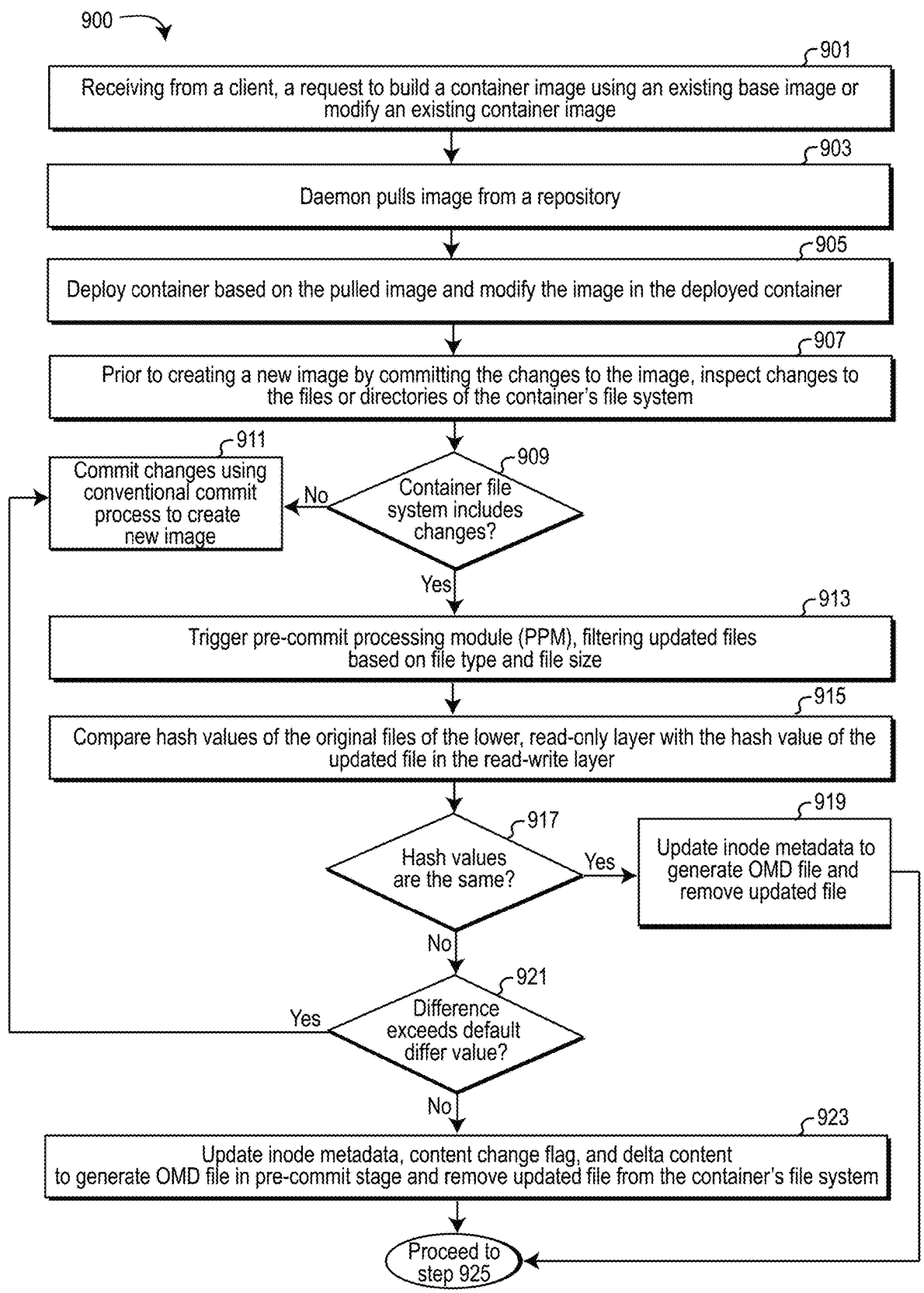
FIG. 9A depicts a flow diagram describing an embodiment of a method for building or modifying image files for deployment by containers, in accordance with the present disclosure.
Figure 9B:
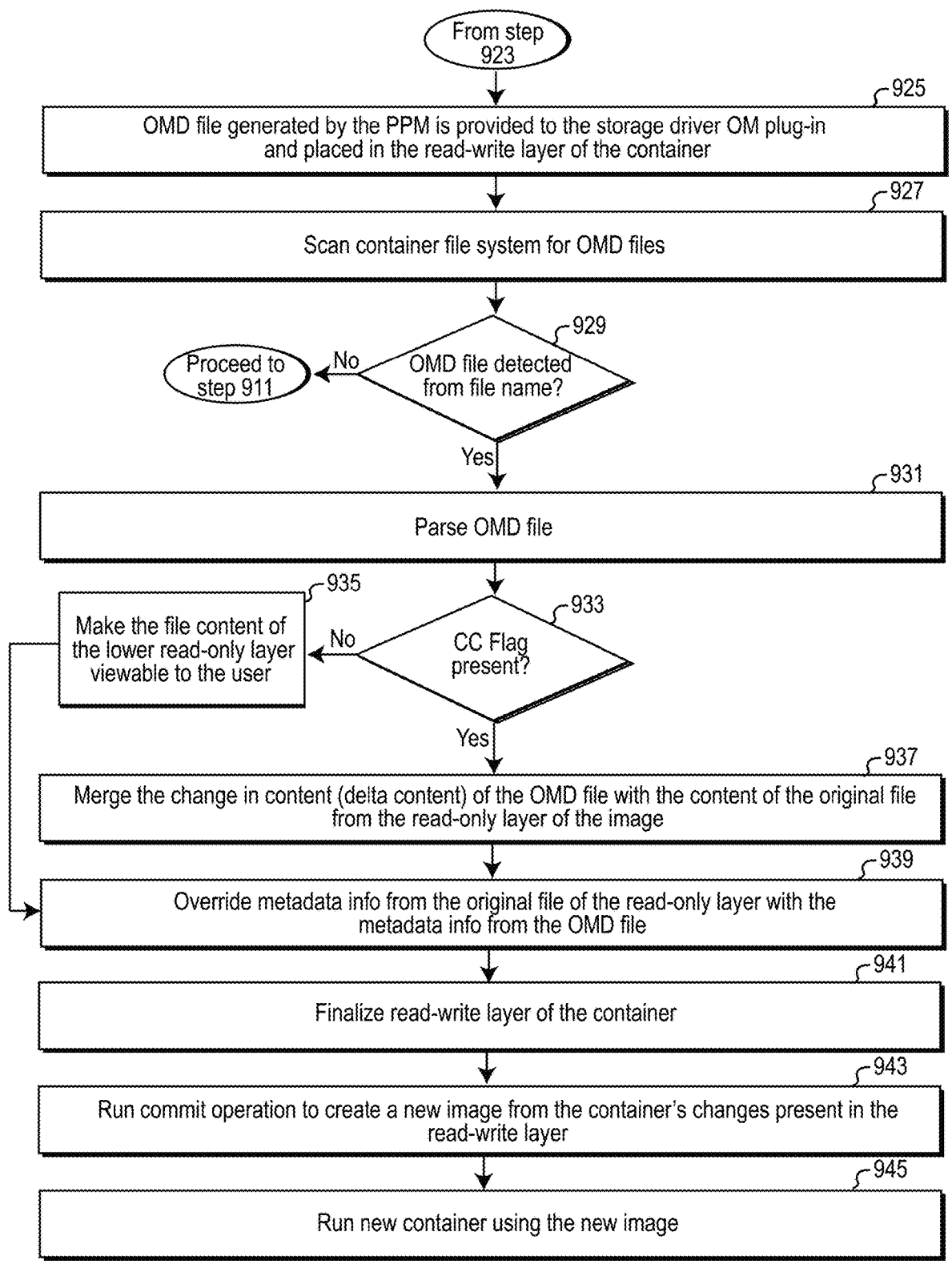
FIG. 9B depicts a continuation of the flow diagram of FIG. 9A describing the embodiment for building or modifying image files for deployment by containers, in accordance with the present disclosure.

The drawings of FIGS. 9A-9B represent embodiments of methods for building or modifying image files for deployment by containers 523, using intelligent layer controls to manage redundant content between layers, as described in accordance with FIGS. 3-8B above, using one or more computing systems defined generically by computing system 100 of FIGS. 1-2; and more specifically by the embodiments of container systems and environments depicted in FIGS. 5-8B and as described herein. A person skilled in the art should recognize that the steps of the method described in FIGS. 9A-9B may be performed in a different order than presented and may not require all the steps described herein to be performed.

The embodiment of method 900 described by FIGS. 9A-9B may begin at step 901. During step 901, a daemon 509 may receive from a client 503 a request to build a container image using an existing image or modify an existing container image. In response to the request, in step 903, daemon 509 may pull the base image or existing image specified by the client's request from registry 515 or image repository 517 thereof to local storage 511 of a host node 501. If the base image or image being modified was previously pulled to local storage 511 of the host node 501, the daemon may not need to pull the pulled image 519 from the registry. In step 905, the daemon 509 may deploy the pulled image 519 as a container 523 within a container runtime environment 521 in order to modify or build a new image 520 in the deployed container.

In step 907 of method 900, prior to creating a new image 520 by committing changes written to the container layer 601 to the new image 520, the daemon 509 may inspect the files or directories of the container's 523 file system for changes to the file system. In step 909, the output from the inspection of the container file system can be analyzed to determine whether or not the container file system includes changes to one or more files or directories of the read-only layers of the file system. If in step 909 the container's file system does not comprise any changes to files or directories in the read-only layers of the file system, the method may proceed to step 911, whereby the daemon 509 may commit changes to the pulled image 519 using a conventional commit process to output a new image 520. Conversely, where the container file system does include changes to one or more files or directories of the read-only layers of the pulled image 519, the method may proceed to step 913 and trigger a pre-commit processing module 510.

During step 913, PPM 510 filters the files or directories identified by the daemon's inspection as having changed between the lower read-only layers of the pulled image 519 and the updated file of the pulled image 519. The PPM 510 may filter the files or directories based on file type, file size, and/or other parameters and attributes. In step 915, PPM 510 may compare hash values of the original files from the lower layer of the pulled image 519 with the hash value of the updated file from the top layer of the pulled image 519. In step 917, based on the comparison of hash values by PPM 510, a determination is made whether or not the hash values are the same. If the hash values are the same, the method 900 may proceed to step 919, whereby PPM 510 updates the file inode metadata 721 to generate an OMD file 620 comprising within the override block of the OMD file 602, the file metadata 621 of the updated file. Once generated, PPM 510 can remove the updated file from the container's file system. For example, by running a rm command to unlink the file or directory from the updated file.

If during step 917, the hash value of the original file in the lower layer is not the same as the hash value of the updated file, the method 900 may proceed to step 921. During step 921, PPM 510 may further examine whether the difference between the hash values exceeds a default differ value, or a threshold value set by a user or administrator of the container system. If the difference between the hash values exceeds the default differ value or threshold value, the method 900 may proceed to step 911 and commit changes to the pulled image 519 using a conventional commit process to create new image 520. Alternatively, if in step 921 the difference between the hash values does not exceed a default differ value or threshold value, the method 900 may proceed to step 923. During step 923, PPM 510 may update the file inode metadata 721, content change flag and/or delta file content 623 to generate an OMD file 620 comprising the file metadata 621 of the updated file, an indication whether the content change flag has a value of true or false, and if true, placing a delta pointer in the merge block of the OMD file 620 indicating where the delta content of the updated file that differs from the original file is stored. Once the OMD file 620 is generated by PPM 510, PPM 510 may remove the updated file from the container's file system. In step 925 of method 900, the OMD file 620 generated by PPM 510 may be provided to the storage driver 512. Embodiments of storage driver 512 may place the OMD file 620 in the container layer 601.

In step 927, storage driver 512 may scan the container file system for OMD files 620. In step 929, the storage driver 512 determines whether or not an OMD file is detected within the container file system based on the file name of each file positioned within the container layer 601. If no OMD files 620 are found within in the container layer 601, the method 900 proceeds to step 911 and commits to the changes in the container layer 601 using a conventional commit process. Conversely, where an OMD file 620 is detected in step 929, the method 900 may proceed to step 931 wherein storage driver 512 parses the OMD file 620. As a result of parsing the OMD file 620, in step 933 a determination is made by the storage driver 512 whether or not the OMD file 620 includes a CC flag indicating that content has changed from the original file positioned within a lower layer. If during step 933, a CC flag is not found, the method 900 may proceed to step 935, wherein storage driver 512 copies-up to user view 711 the file content 723 of the original file within the lower layer 709 and proceeds to step 939 discussed below. Alternatively, if a CC flag is identified as being present within the OMD file 620, the method proceeds to step 937. During step 937, storage driver 512 merges the change in content (i.e., the delta file content 623) of the OMD file 620 with the delta file content 623 of the original file positioned within the lower layer 709 and maps to the user view 711, both the delta file content 623 and file content 723. Such a mapping allows the user to view the contents of the container file system which includes the merged content of both the original file and the delta appearing in the updated file.

In step 939, the storage driver 512 overrides the file inode metadata 721 from the original file within the lower layer 709 and maps the file metadata 621 of the OMD file 620 to the user view 711. In step 941, the read-write layer (container layer 601) is finalized based on the OMD file 620 and the original file which form the whole content that will be available, as visible to the user via user view 711. In step 943, the daemon 509 runs a commit operation creating a new image 520 from the changes to the container 523, as represented in the read-write layer to be added as a new layer on top of the existing layers within new image 520. In step 945, the daemon 509 deploys a new container 524 running the new image 520.

What is claimed is:

1. A computer-implemented method for building or modifying an image file into a new image for deployment as a container, the computer-implemented method comprising:

inspecting, by a daemon, files or directories of a container file system of the image file for changes to the files or the directories;

in response to inspection of the container file system containing changes to the files or the directories, filtering, by the daemon, an updated file copied-up from the image file into a read-write layer;

comparing, by the daemon, a hash value of an original file of the container file system from a lower, read-only layer of the image file with a hash value of the updated file;

in response to comparing the hash value of the original file with the hash value of the updated file, the hash value of the original file and the hash value of the updated file are the same or a difference between the hash value of the original file and the hash value of the updated file exceeds a default differ value, generating, by the daemon, an override and merge data (OMD) file comprising an override block and a merge block;

updating, by the daemon, metadata of the override block from inode metadata of the original file stored in the lower layer of the image file to metadata of the updated file; and removing, by the daemon, the updated file from the container file system.

2. The computer-implemented method of claim 1, wherein the difference between the hash value of the original file and the hash value of the updated file exceeds a default differ value, the computer-implemented method further comprises:
  updating, by the daemon, the merge block of the OMD file with delta content information indicating content has changed between the original file and the updated file, and a pointer indicating a storage area containing delta content.

3. The computer-implemented method of claim 1, further comprising:
  scanning, by the storage driver, the read-write layer for each file present within the read-write layer;
  upon detecting the OMD file within the read-write layer, parsing, by the storage driver, the OMD file for a content change flag within the merge block; and
  upon parsing the OMD file and identifying the content change flag within the OMD file has a value of true, merging, by the storage driver, content of the original file with delta content of the OMD file.

4. The computer-implemented method of claim 3, further comprising:
  upon parsing the OMD file and identifying the content change flag within the OMD file has a value of false, overriding, by the storage driver, the inode metadata of the original file with metadata of the override block of the OMD file.

5. The computer-implemented method of claim 3, further comprising:
  overriding, by the storage driver, the inode metadata of the original file with metadata of the override block of the OMD file.

6. The computer-implemented method of claim 3, further comprising:
  running, by the daemon, a commit operation creating the new image comprising a new read-only layer containing the files of read-write layer placed on top of all previous read-only layers from the image file.

7. The computer-implemented method of claim 1, wherein generating the OMD file comprising the override block and the merge block occurs when no content change between the original file and the updated file occurs, only a change to one or more properties of the inode metadata of the original file stored in the lower layer, or there is a change to the between the original file and the updated file and a change in file size below a threshold level.

8. A computing program product for building or modifying image files into a new image for deployment as a container comprising:
  one or more computer readable storage media having computer-readable program instructions stored on the one or more computer readable storage media, said program instructions executes a computer-implemented method comprising:
    inspecting, by a daemon, files or directories of a container file system of the image file for changes to the files or the directories;
    in response to inspection of the container file system containing changes to the files or the directories, filtering, by the daemon, an updated file copied-up from the image file into a read-write layer;
    comparing, by the daemon, a hash value of an original file of the container file system from a lower, read-only layer of the image file with a hash value of the updated file;
    in response to comparing the hash value of the original file with the hash value of the updated file, the hash value of the original file and the hash value of the updated file are the same or a difference between the hash value of the original file and the hash value of the updated file exceeds a default differ value, generating, by the daemon, an override and merge data (OMD) file comprising an override block and a merge block;
    updating, by the daemon, metadata of the override block from inode metadata of the original file stored in the lower layer of the image file to metadata of the updated file; and
    removing, by the daemon, the updated file from the container file system.

9. The computing program product of claim 8, wherein the difference between the hash value of the original file and the hash value of the updated file exceeds a default differ value, the computer-implemented method further comprises:
  updating, by the daemon, the merge block of the OMD file with delta content information indicating content has changed between the original file and the updated file, and a pointer indicating a storage area containing delta content.

10. The computing program product of claim 8, further comprising:
  placing, by a storage driver of the daemon, the OMD file in the read-write layer;
  scanning, by the storage driver, the read-write layer for each file present within the read-write layer;
  upon detecting the OMD file within the read-write layer, parsing, by the storage driver, the OMD file for a content change flag within the merge block; and
  upon parsing the OMD file and identifying the content change flag within the OMD file has a value of true, merging, by the storage driver, content of the original file with delta content of the OMD file and place the content and delta content into a final file within a user viewable layer of the image file.

11. The computing program product of claim 10, further comprising:
  upon parsing the OMD file and identifying the content change flag within the OMD file has a value of false, overriding, by the storage driver, the inode metadata of the original file with metadata of the override block of the OMD file.

12. The computing program product of claim 10, further comprising:
  overriding, by the storage driver, the inode metadata of the original file with metadata of the override block of the OMD file.

13. The computing program product of claim 10, further comprising:
  running, by the daemon, a commit operation creating the new image comprising a new read-only layer containing the files of read-write layer placed on top of all previous read-only layers from the image file.

14. The computing program product of claim 8, wherein generating the OMD file comprising the override block and the merge block occurs when no content change between the original file and the updated file occurs, only a change to one or more properties of the inode metadata of the original file stored in the lower layer, or there is a change to the content between the original file and the updated file and a change in file size below a threshold level.

15. A computer system for building or modifying image files into a new image for deployment as a container comprising:
- a processor; and
- a computer-readable storage media coupled to the processor, wherein the computer-readable storage media contains program instructions executing, via the processor, a computer-implemented method comprising:
  - inspecting, by a daemon, files or directories of a container file system of the image file for changes to the files or the directories;
  - in response to inspection of the container file system containing changes to the files or the directories, filtering, by the daemon, an updated file copied-up from the image file into a read-write layer;
  - comparing, by the daemon, a hash value of an original file of the container file system from a lower, read-only layer of the image file with a hash value of the updated file;
  - in response to comparing the hash value of the original file with the hash value of the updated file, the hash value of the original file and the hash value of the updated file are the same or a difference between the hash value of the original file and the hash value of the updated file exceeds a default differ value, generating, by the daemon, an override and merge data (OMD) file comprising an override block and a merge block;
  - updating, by the daemon, metadata of the override block from inode metadata of the original file stored in the lower layer of the image file to metadata of the updated file; and
  - removing, by the daemon, the updated file from the container file system.

16. The computer system of claim 15, wherein the difference between the hash value of the original file and the hash value of the updated file exceeds a default differ value, the computer-implemented method further comprises:
updating, by the daemon, the merge block of the OMD file with delta content information indicating content has changed between the original file and the updated file, and a pointer indicating a storage area containing delta content.

17. The computer system of claim 15, further comprising:
- placing, by a storage driver of the daemon, the OMD file in the read-write layer;
- scanning, by the storage driver, the read-write layer for each file present within the read-write layer;
- upon detecting the OMD file within the read-write layer, parsing, by the storage driver, the OMD file for a content change flag within the merge block; and
- upon parsing the OMD file and identifying the content change flag within the OMD file has a value of true, merging, by the storage driver, content of the original file with delta content of the OMD file.

18. The computer system of claim 17, further comprising:
- upon parsing the OMD file and identifying the content change flag within the OMD file has a value of false, overriding, by the storage driver, the inode metadata of the original file with metadata of the override block of the OMD file.

19. The computer system of claim 17, further comprising:
- overriding, by the storage driver, the inode metadata of the original file with metadata of the override block of the OMD file.

20. The computer system of claim 15, wherein generating the OMD file comprising the override block and the merge block occurs when no content change between the original file and the updated file occurs, only a change to one or more properties of the inode metadata of the original file stored in the lower layer, or there is a change to the between the original file and the updated file and a change in file size below a threshold level.

* * * * *